United States Patent
Patel

(10) Patent No.: US 9,239,832 B2
(45) Date of Patent: Jan. 19, 2016

(54) MODIFYING LANGUAGE OF A USER INTERFACE ON A COMPUTING DEVICE

(75) Inventor: Ankitkumar Patel, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 130 days.

(21) Appl. No.: 13/565,965

(22) Filed: Aug. 3, 2012

(65) Prior Publication Data

US 2014/0039872 A1 Feb. 6, 2014

(51) Int. Cl.
*G06F 17/28* (2006.01)
*G06F 9/44* (2006.01)

(52) U.S. Cl.
CPC ............ *G06F 17/289* (2013.01); *G06F 9/4448* (2013.01)

(58) Field of Classification Search
USPC ........................................................ 704/2–10
See application file for complete search history.

(56) References Cited

U.S. PATENT DOCUMENTS

| | | | | |
|---|---|---|---|---|
| 5,983,182 | A * | 11/1999 | Moore | 704/270 |
| 7,742,048 | B1 * | 6/2010 | Moore et al. | 345/467 |
| 7,783,637 | B2 * | 8/2010 | Bitsch et al. | 707/736 |
| 8,862,455 | B2 * | 10/2014 | Aryattawanich et al. | 704/2 |
| 2002/0091510 | A1 * | 7/2002 | Forrest et al. | 704/8 |
| 2002/0111933 | A1 * | 8/2002 | Noble et al. | 707/1 |
| 2003/0009320 | A1 * | 1/2003 | Furuta | 704/2 |
| 2003/0046527 | A1 * | 3/2003 | Musuchenborn | 713/1 |
| 2003/0140098 | A1 * | 7/2003 | Brennan et al. | 709/203 |
| 2004/0044518 | A1 * | 3/2004 | Reed et al. | 704/8 |
| 2005/0071324 | A1 * | 3/2005 | Bitsch et al. | 707/3 |
| 2005/0240565 | A1 * | 10/2005 | Kapitanski et al. | 707/1 |
| 2007/0244691 | A1 * | 10/2007 | Alwan et al. | 704/8 |
| 2008/0077268 | A1 * | 3/2008 | Retlich et al. | 700/117 |
| 2008/0174485 | A1 * | 7/2008 | Carani et al. | 342/357.07 |
| 2008/0288474 | A1 * | 11/2008 | Chin et al. | 707/4 |
| 2008/0294652 | A1 * | 11/2008 | Manu et al. | 707/100 |
| 2009/0070094 | A1 * | 3/2009 | Best et al. | 704/2 |
| 2009/0132232 | A1 * | 5/2009 | Trefler | 704/2 |
| 2009/0254456 | A1 * | 10/2009 | Sarbaev et al. | 705/27 |
| 2011/0125486 | A1 * | 5/2011 | Jaiswal | 704/3 |
| 2011/0191703 | A1 * | 8/2011 | Doser et al. | 715/763 |
| 2011/0282643 | A1 * | 11/2011 | Chatterjee et al. | 704/2 |
| 2012/0072360 | A1 * | 3/2012 | Sarbaev et al. | 705/319 |

* cited by examiner

*Primary Examiner* — Leonard Saint Cyr
(74) *Attorney, Agent, or Firm* — Lowenstein Sandler LLP

(57) ABSTRACT

A mechanism for modifying a language of a user interface in a computing device. A method includes receiving, by a computing device, a request to modify a first language of a user interface of the computing device to a second language. The user interface comprises text displayed in the first language. The method also includes converting, by the computing device, the first language of the user interface to the second language during runtime of the computing device without losing a session of a user of the computing device.

20 Claims, 6 Drawing Sheets

MODIFYING LANGUAGE OF A USER INTERFACE ON A COMPUTING DEVICE

TECHNICAL FIELD

The embodiments of the invention relate generally to language modification on a computing device and, more specifically, relate to a mechanism for modification of the language of user interface on a computing device.

BACKGROUND

Language localization is the process of translating a product into different languages or adapting a language for a specific country or region. In the global market existing today, language localization is one of the most important features for any computing application. Many such language localizations occur at application level on a computing device or at a user interface of a website.

Currently, in order for a user to view the user interface of a computing device with a language of the user's choice, the user explicitly selects the preferred language before logging into the computing device. Also, after logging into the computing device, if the user wishes to switch the user interface to another language, he/she should log out of the computing device, select the a different language, and then log back into the computing device. This approach forces the user to end the existing session and restart the session, which consumes a great deal of time and places a burden on the user.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
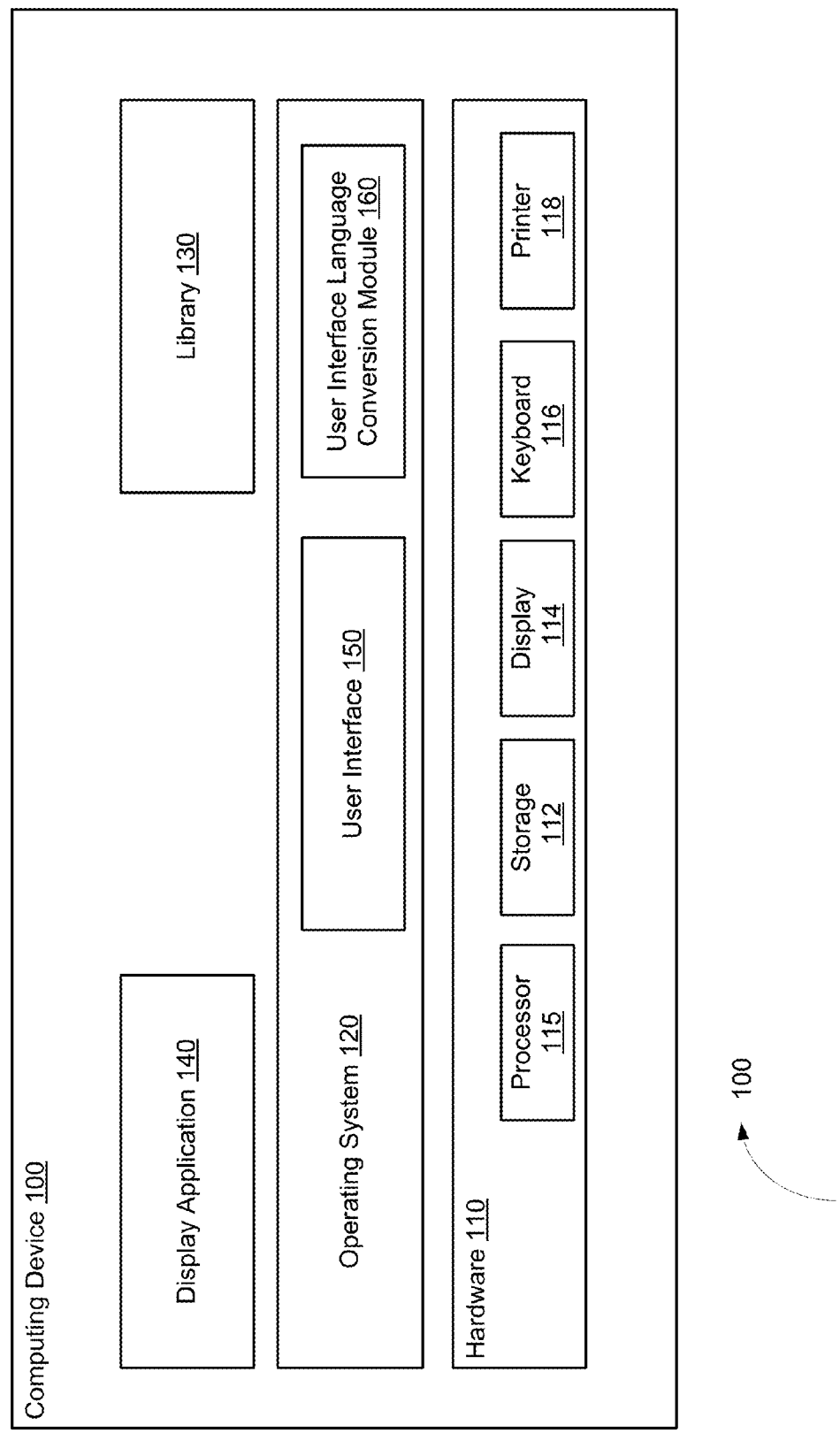
FIG. 1 is a block diagram of a computing platform to perform language modification on a user interface according to an embodiment of the invention.

Embodiments of the invention provide a mechanism for modifying a language of user interface in a computing device. In one embodiment, a method includes receiving, by a computing device, a request to modify a first language of a user interface of the computing device to a second language. The user interface comprises text displayed in the first language. The method also includes converting, by the computing device, the first language of the user interface to the second language during runtime of the computing device without losing a session of a user of the computing device.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "converting", "retrieving", "displaying", "selecting", "replacing", "rendering", "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide systems and methods for modifying a language of user interface (UI) in a computing device. The computing device receives a request to modify a first language of a UI of the computing device to a second language. The first language includes text of the language currently displayed on the computing device. The computing device converts the first language of the UI to the second language during run-time without losing a session of a user of the computing device. Run-time is a period during which a program in the computer is currently being executed. As a result of embodiments, the language of the UI is modified without the user logging off and back into the computing device.

FIG. 1 is a block diagram of a computing device 100 to perform language modification of a user interface during runtime of the computing device 100 according to an embodiment of the invention. At the lowest-level, system 100 includes hardware 110, such as processor 115 and storage 112. System 100 may further include peripheral devices, such as a display device 114, a keyboard, 116, and a printer 118. Operating on top of hardware 110 is an operating system (OS) 120, such as a Windows™ or Linux™-based operating system. The computing device 100 may also include a library 130 on top of hardware 110.

Library 130 includes translations of different languages pre-installed on the computing device 110. Such languages include, but are not limited to, Hindi, Chinese, Japanese, Korean, Hebrew, or Greek, to name a few examples. In some embodiments, any language included in the translations in the library 130 may be selected by a user for run-time modification of a UI language of the computing device 100. For example, a current language used in a UI of the computing device may be changed during runtime of the computing device to display another language selected by the user, without the user having to log off and back onto the computing device 100. In one embodiment, the translations searched from the Library 130 are represented correctly using various rendering mechanism including but not limited to International Components for Unicode (ICU).

Computing device 100 may also run a display application 140, which displays text in a specific language on a screen of the computing device 100. Such text include but not limited to "Applications", "File", "Documents", "Open", "Save" and many more. In one embodiment, the display application 140 is an X-window display application, which provides windowing on computer displays and manages many control functions.

In one embodiment, the OS 120 includes a user interface (UI) 150, which refers to graphical, textual and auditory information the OS presents to the user, and the control sequences (such as keystrokes with the computer keyboard, movements of the computer mouse, and selections with the touch screen) the user employs to control the computing device 100, and in particular, the OS 120. In one embodiment, the UI 150 is a graphical user interface (GUI).

The OS 120 also includes a user interface language conversion module (UILC) module 160 to provide a language modification mechanism for the UI 150. Embodiments of the invention utilize the UILC module 160 to change a currently displayed language of the UI 150 to another language selected by a user. In one embodiment, the UILC module 160 performs the language change during run-time of the computing device 150. As defined above, run-time is a period during which a program in the computer is currently being executed. The language selected by the user may be the user's native language.

In some embodiments, the UILC module 160 converts the currently displayed language of the user interface to another language selected by the user during runtime of the computing device without losing a session of a user of the computing device. More specifically, the UILC module 160 functions to convert the currently displayed language to the user selected language without the user logging off and back into the computing device. In other embodiments, the UILC module 160 may retrieve a translation among the pre-installed translations in the library 130 and replace text (of a currently displayed language) in the current UI with text of the user selected language. In one embodiment, the UILC module 160 resets a value of a language environment variable to the selected second language. The language environment variable is a preset as a value specific to the user and provides for location of translations to applications that may be specific to the user. In another embodiment, the UILC module 160 enables to search and retrieve the translation of the selected second language based on the reset value. In another embodiment, the UILC module 160 functions to refresh or reload the session of a user with the reset value at the same time as it retrieves translations which helps in not logging off from the current environment. The UILC module 160 further functions to instruct the display application 140 to display the text on the UI 150 with the user selected language during run-time. Operations of the UILC module 160 are described in more detail in the following paragraphs.

Figure 2:
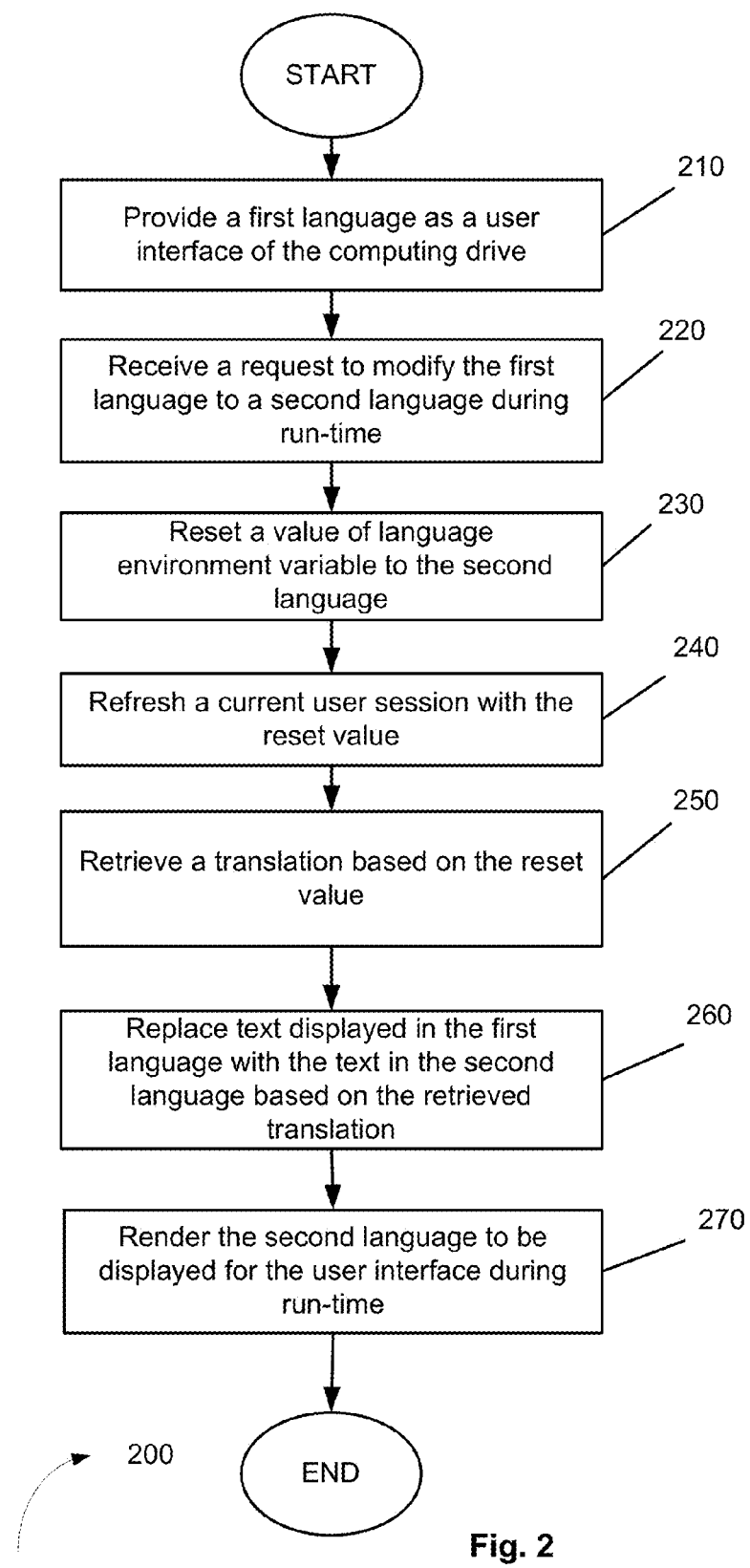
FIG. 2 is a flow diagram illustrating a method for modifying language of a user interface in a computing device according to an embodiment of the invention.

FIG. 2 is a flow diagram illustrating a method 200 for modifying a language of a user interface during runtime in a computing device according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by computing platform 100 of FIG. 1.

Method 200 begins at block 210 where a UI of a computing device is provided to a user in a first language. As an example, the first language is English. As discussed above, the UI includes text. As such, the text of the UI is displayed in English. At block 220, a request to modify the first language of the UI to a second language is received during run-time. In one embodiment, a user selects the second language among a plurality of various languages provided to the user via a drop down menu on the UI of the computing device. The second language selected by the user is different from the first language displayed on the UI. As an example, the second language selected by the user is Chinese.

At block 230, a value of a language environment variable is reset to the second language. As described above, the language environment variable provides location of translations to applications that may be specific to the user. In one embodiment, the language environment variable is preset as a value specific to the user. As such, the resetting the value of the language environment variable enables to search for the translations. At block 240, a current user session is refreshed or reloaded with the reset value of the language environment variable. At block 250, a translation is retrieved based on the reset value of the language environment variable. In one embodiment, the translation is retrieved from the pre-installed translations stored in the library. In one embodiment, the translation is retrieved from the pre-installed translations at the same time the user session is refreshed or reloaded. At block 260, the text displayed in the first language is replaced by the text in the second language based on the retrieved translation. At block 270, the second language is rendered for display at the user interface during run time.

Figure 3A:
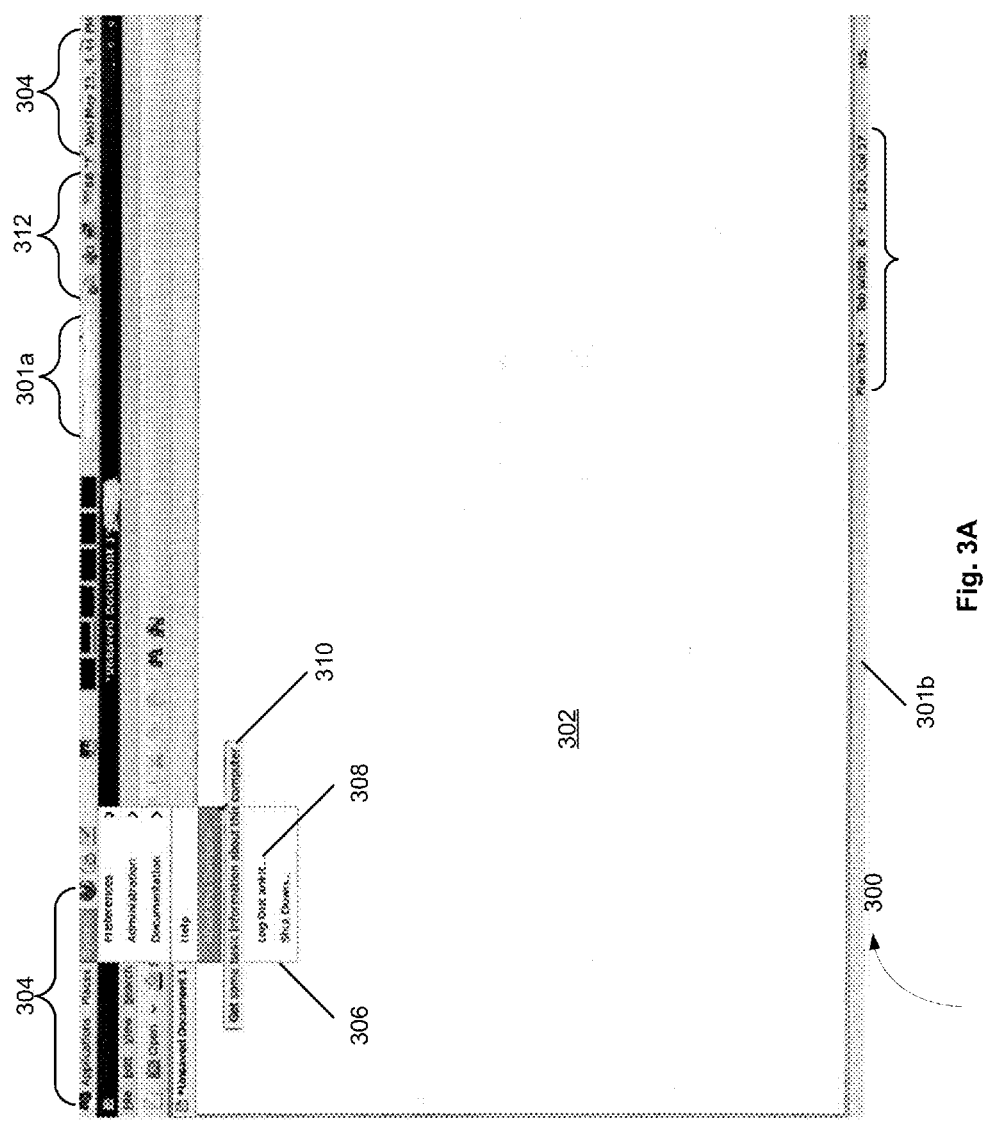
FIGS. 3A-3C are screenshots illustrating certain graphical user interfaces (GUIs) for presenting language modification according to certain embodiments of the invention.
Figure 3B:
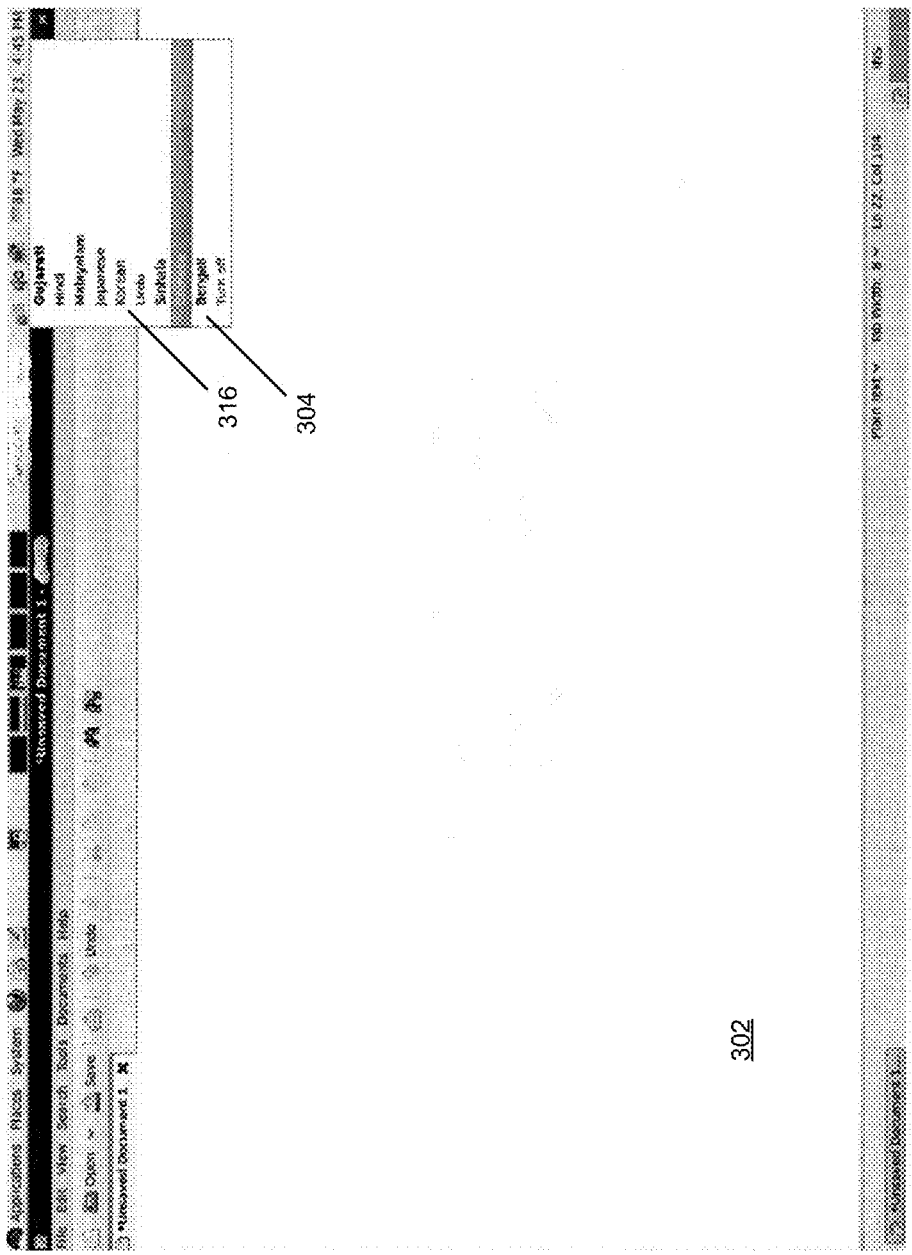
Figure 3C:
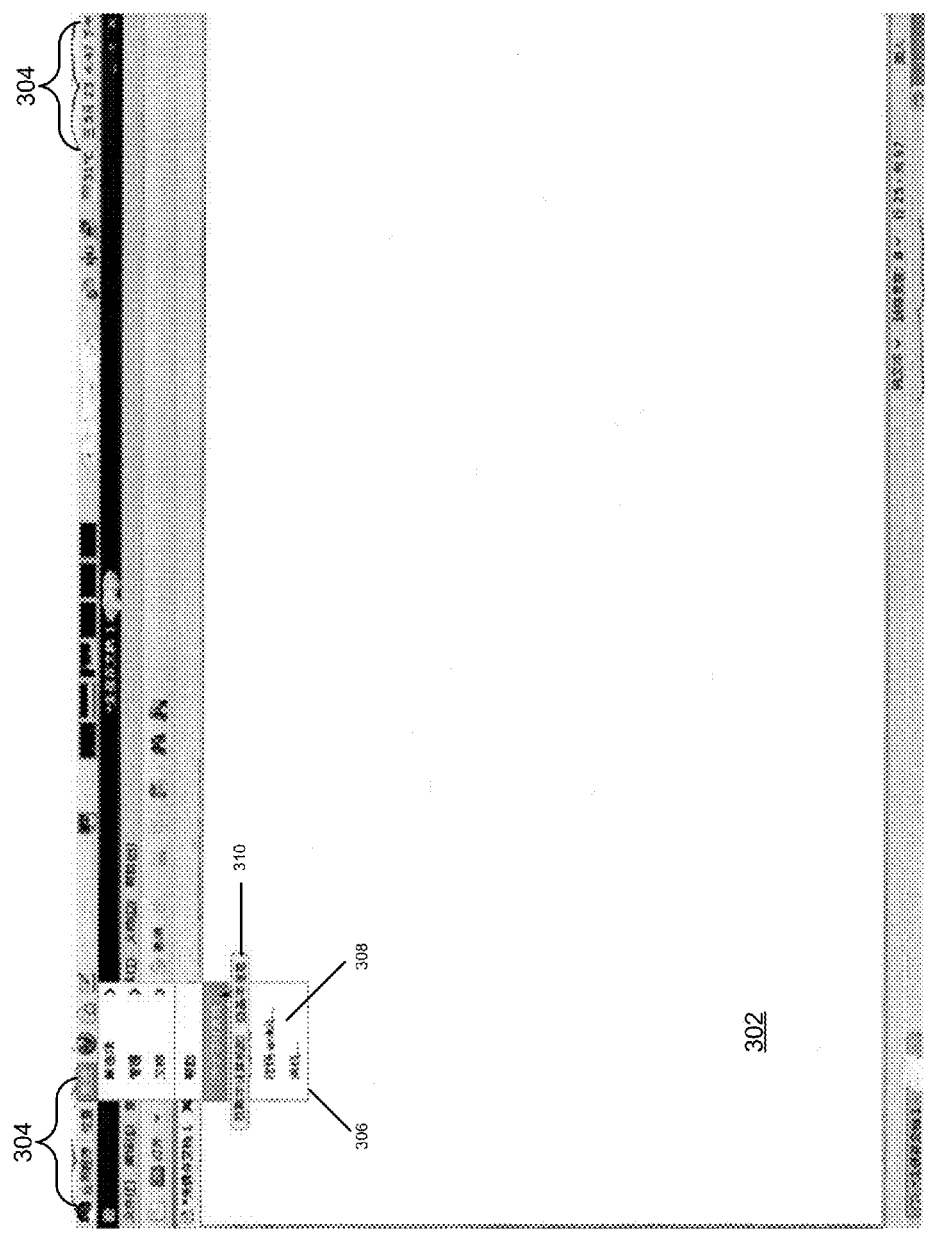

FIGS. 3A-3C are screenshots illustrating certain GUIs for providing for language modification according to certain embodiments of the invention. For example, GUI 300 may be displayed as part of the UI 150 of the computing device 100 of FIG. 1. Referring to FIGS. 3A-3C, GUI 300 includes a top menu bar 301a and a bottom menu bar 301b and windowing area 302. Both the top menu bar 301a and the bottom menu bar 301b includes text 304. In one embodiment, the top menu bar includes text 304 such as "Applications", "Places", "System", "Open", "Save", "File", "Documents" etc.

In one example, upon user selection of the text "System", the user is provided with a drop down menu box 306, which includes associated text 308 such as "Preferences", "Administration", "Documentation", "Help", "About this Computer" etc associated with the text "System". In one example, upon user selection of the associated text 308, "About this Computer", the user is provided with further text detail 310 such as "Get some basic information about this computer" corresponding to the associated text 308 "About this Computer". In one embodiment, the bottom menu bar includes texts 304 such as "Unsaved Document 1", "Plain Text", "Tab Width" etc. In another embodiment, both the top and bottom menu bars 301a and 301b include symbols 312. Some examples of the symbols are keyboard, speaker, a computer etc.

According to one embodiment, the texts 304, the associated text 308 and the further text details 310 corresponding to the associated text 308 in GUI are initially displayed in English as illustrated in FIG. 3A. In one embodiment, during run time, when the user moves the cursor and clicks on a symbol 312 of a keyboard, a drop down menu box 314 listing different languages 316 is displayed to the user as illustrated in FIG. 3B. Some of these languages include, but are not limited to, Gujarati, Hindi, Malayalam, Japanese, Korean, Urdu, Sinhala, Chinese, Bengali, and so on. In one embodiment, during run time, upon user's selection of the Chinese language from the drop down menu box 314, the text 304 in both the top menu bar and the bottom menu bars 301a and 301b respectively, the associated text 308 and further text detail 310 corresponding to the associated text 308 of the user interface are displayed in Chinese as illustrated in FIG. 3C.

Figure 4:
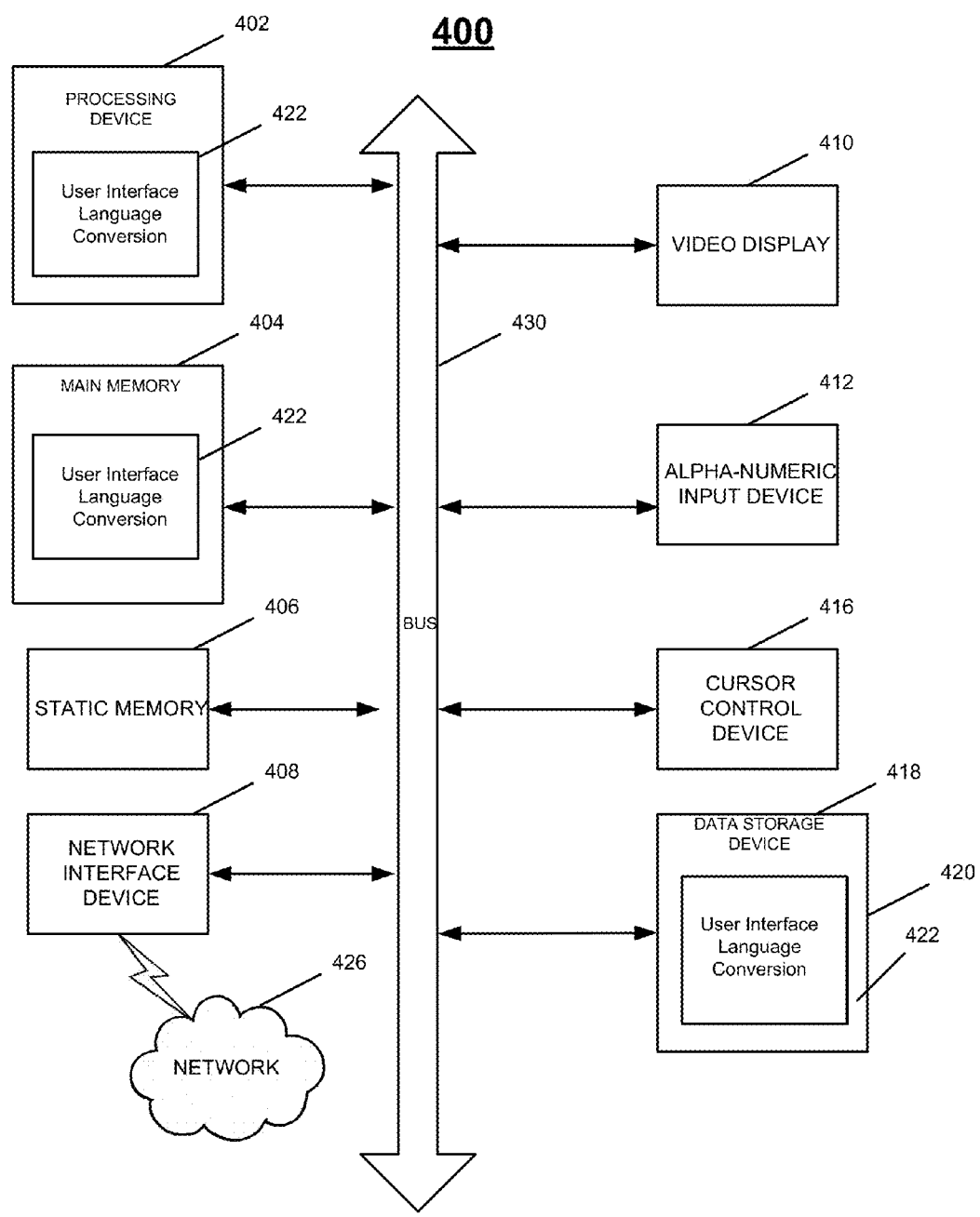
FIG. 4 illustrates a block diagram representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 includes a processing device 402, a memory 406 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute user interface language conversion logic 422 for performing the operations and steps discussed herein. In one embodiment, UILC module 112 described with respect to FIG. 1 performs the user interface language conversion logic 422.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 614 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. user interface language conversion logic 422) embodying any one or more of the methodologies of functions described herein, such as method 300 for modifying a language of a user interface in a computing device as described with respect to FIG. 3. The user interface language conversion logic 422 may also reside, completely or at least partially, within the memory 404 and/or within the processing device 402 during execution thereof by the computer system 400; the memory 406 and the processing device 402 also constituting machine-accessible storage media.

The machine-readable storage medium 420 may also be used to store the user interface language conversion logic 422 persistently containing methods that call the above applications. While the machine-accessible storage medium 420 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
displaying, by a processing device, a first label associated with an element in a first language among a plurality of languages on a user interface of a computing device, wherein the first label is part of an application of the computing device;
in response to a selection of the first label by a user, displaying, by the processing device, a list of the plurality of languages on the user interface of the computing device;
resetting, by the processing device, a value of a language environment variable in view of a second language among the plurality of languages selected by the user, wherein the language environment variable is set as the value specific to the user and is indicative of a location of a plurality of translations to the application of the computing device;
converting, by the processing device, the first label associated with the element in the first language on the user interface to a second label associated with the element in the selected second language among the plurality of languages on the user interface during a runtime of the computing device; and
displaying, by the processing device, the second label associated with the element in the second language on the user interface during the runtime of the computing device.

2. The method of claim 1, wherein the first label associated with the element in the first language of the user interface is converted into the second label associated with the element in the second language without losing a session of a user of the computing device.

3. The method of claim 2 further comprises refreshing the session of the user of the processing device with the reset value.

4. The method of claim 3 further comprises retrieving a translation among the plurality of translations in view of the reset value.

5. The method of claim 4 further comprises replacing, during the runtime the computing device, the first label associated with the element in the first language with the second label associated with the element in the second language in view of the retrieved translation.

6. The method of claim 4 wherein the refreshing of the session with the reset value and the retrieving of the translation occurs at a first time.

7. The method of claim 1 wherein a search for translation among the plurality of translations is enabled upon the resetting of the value of the language environment variable to a second language.

8. A system, comprising:
a memory;
a processing device, operatively coupled to the memory, the processing device to:
display a first label associated with an element in a first language among a plurality of languages on a user interface of a computing device, wherein the first label is part of an application of the computing device;
in response to a selection of the first label by a user, display a list of the plurality of languages on the user interface of the computing device;
reset a value of a language environment variable in view of a second language among the plurality of languages selected by the user, wherein the language environment variable is set as the value specific to the user and is indicative of a location of a plurality of translations to the application of the computing device;
convert the first label associated with the element in the first language on the user interface to a second label associated with the element in the selected second language among the plurality of languages on the user interface during a runtime of the computing device; and
display the second label associated with the element in the second language on the user interface during the runtime of the computing device.

9. The system of claim 8, wherein the first label associated with the element in the first language of the user interface is converted into the second label associated with the element in the second language without losing a session of a user of the computing device.

10. The system of claim 9, the processing device to refresh the session of the user of the computing device with the reset value.

11. The system of claim 10, the processing device to retrieve a translation among the plurality of translations in view of the reset value.

12. The system of claim 11, the processing device to replace, during the runtime of the computing device, the first label associated with the element in the first language with the second label associated with the element in the second language in view of the retrieved translation.

13. The system of claim 11 wherein the session is refreshed with the reset value and the translation is retrieved at a first time.

14. The system of claim 8 wherein a search for translation among the plurality of translations is enabled upon the reset of the value of the language environment variable to a second language.

15. A non-transitory computer-readable storage medium embodying instructions that, when executed by a processing device, cause the processing device to:
display, by the processing device, a first label associated with an element in a first language among a plurality of languages on a user interface of a computing device, wherein the first label is part of an application of the computing device;
in response to a selection of the first label by a user, display, by the processing device, a list of the plurality of languages on the user interface of the computing device;
reset, by the processing device, a value of a language environment variable in view of a second language among the plurality of languages selected by the user, wherein the language environment variable is set as the value specific to the user and is indicative of a location of a plurality of translations to the application of the computing device;
convert, by the processing device, the first label associated with the element in the first language on the user interface to a second label associated with the element in the selected second language among the plurality of languages on the user interface during a runtime of the computing device; and display, by the processing device, the second label associated with the element in the second language on the user interface during the runtime of the computing device.

16. The non-transitory computer-readable storage medium of claim 15, the processing device to refresh a session of the user of the processing device with the reset value.

17. The non-transitory computer-readable storage medium of claim 16, the processing device to retrieve a translation among the plurality of translations in view of the reset value.

18. The non-transitory computer-readable storage medium of claim 17, the processing device to replace, during the runtime of the computing device, the first label associated with the element in the first language with the second label associated with the element in the second language in view of the retrieved translation.

19. The non-transitory computer-readable storage medium of claim 17 wherein the session of the user of the processing device is refreshed with the reset value and the translation is retrieved at a first time.

20. The non-transitory computer-readable storage medium of claim 15 wherein a search for translation among the plurality of translations is enabled upon the reset of the value of language environment variable to a second language.

\* \* \* \* \*